Patented Nov. 25, 1947

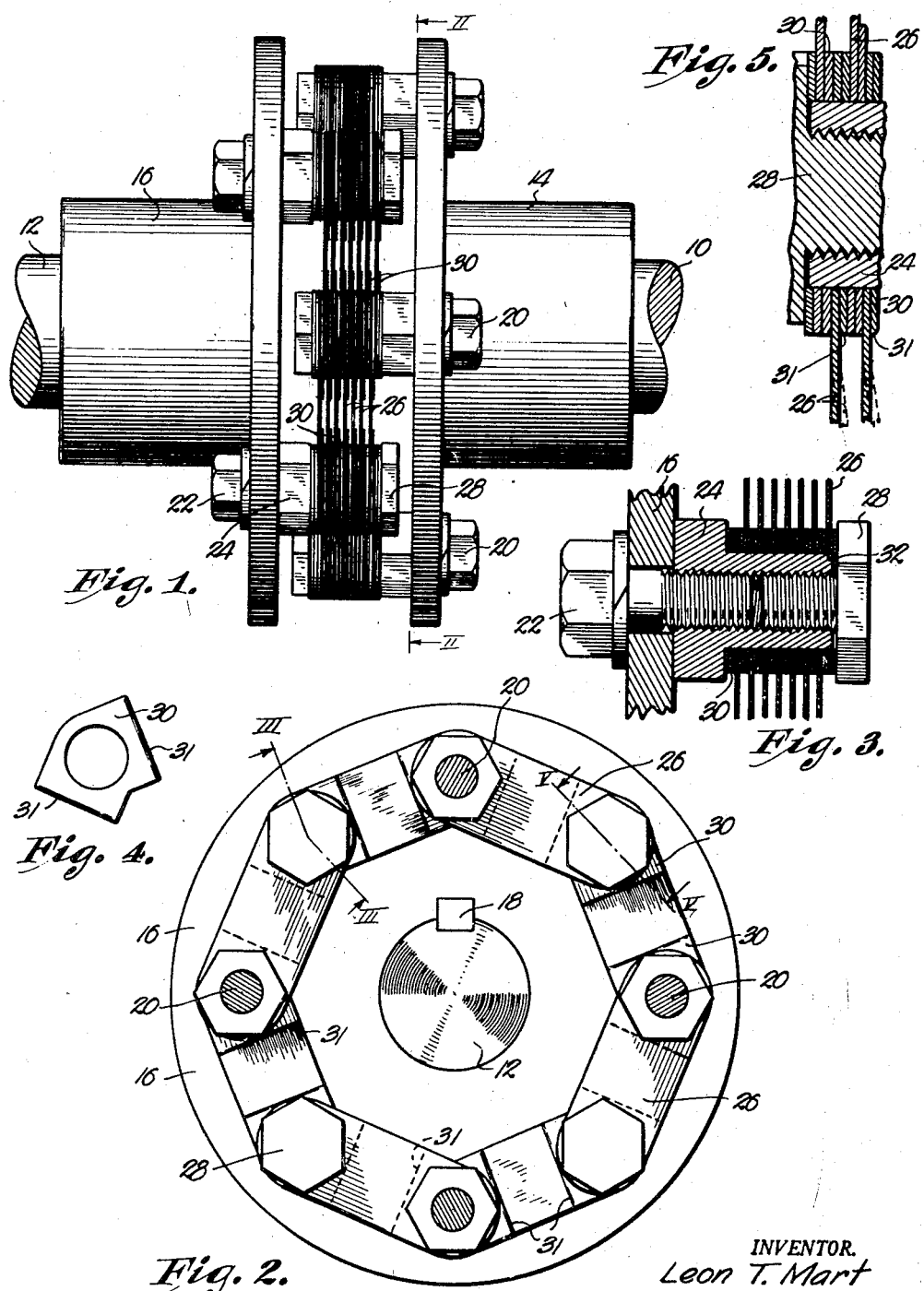

2,431,409

UNITED STATES PATENT OFFICE 2,431,409

FLEXIBLE COUPLING

Leon T. Mart, Mission Township, Johnson County, Kans., assignor to The Marley Company, Inc., Kansas City, Kans., a corporation of Kansas Application March 9, 1944, Serial No. 525,678

2 Claims. (Cl. 64—12)

This invention relates to machine elements in the nature of flexible couplings for power equipment and has for a primary aim the provision of unique, effective, efficient and long-lasting power transferring parts capable of transmitting energy without force loss.

A further object of this invention is the provision of a flexible coupling having power transmitting units arranged in a circumscribing path about the axis of rotation of the coupling parts, and that are formed to cause the driving force to be transmitted through rectilinear paths.

This invention has for an even further important object to provide in a flexible coupling of the aforementioned character, a plurality of power transmitting elements, each provided with transversely extending, straight, fulcrum-forming edges, to the end that the bending stress is equalized throughout the width of the parts as the same are flexed.

A still further aim of this invention is to provide in a flexible coupling a number of straight power transmitting elements arranged in groups and spaced apart by specially formed fulcrum-creating members, the longitudinal axis of each transmitting element being disposed at right angles to a radial line extending from the axis of rotation of the coupling through a medial point on said longitudinal axis.

A still further important object of the invention is the provision of a flexible coupling having means for insuring the flexing of power transmitting elements throughout a line of bend extending transversely thereacross, which line of bend is established by an arcuate face about which the power transmitting elements are drawn.

Other objects of the invention will appear during the course of the following specification, referring to the accompanying drawing, wherein:

Fig. 1 is a side elevational view of a flexible coupling made in accordance with the present invention.

Fig. 2 is a transverse cross sectional view taken on line II—II of Fig. 1, and looking in the direction of the arrows.

Fig. 3 is an enlarged fragmentary detailed sectional view taken on line III—III of Fig. 2, looking in the direction of the arrows.

Fig. 4 is a plan view of the perforated spacer entirely removed from association with the remaining parts of the coupling; and Fig. 5 is an enlarged fragmentary detailed sectional view taken along line V—V of Fig. 2, looking in the direction of the arrow.

The flexible coupling illustrated and about to be described is generally of the commercial type and is employed to operatively interconnect a drive shaft 10 and a driven shaft 12. These shafts may be a part of any mechanism requiring the employment of a flexible connection and shafts 10 and 12 may be secured to coupling members 14 and 16 respectively, in any one of many well-known ways. In the illustrated embodiment of the equipment, a key 18 is used to secure shaft 12 to coupling member 16 and the same method of interconnection may be used with respect to shaft 10 and coupling member 14.

The flanged portion of each coupling member 14 and 16 is perforated to receive a series of machine screws. Such machine screws 20 are carried by coupling member 14 while machine screws 22 are mounted upon coupling member 16 in opposed, staggered relation with machine screws 20. A stud 24 is mounted upon each machine screw 20 and 22 respectively, to receive the ends of links 26. Each link 26 is provided with an opening through which stud 24 is passed and when the appropriate number of links 26 are moved to position, a cap screw 28 is threaded into the bore of each stud 24.

Links 26 are identical in character and the distance between the openings 32 thereof, is the same as the distance between machine screws 20 and 22. One end of each link 26 is in engagement with a machine screw on coupling member 14, while the other end of the same link 26 is connected to a machine screw on coupling member 16.

As illustrated in Fig. 3, studs 24 are passed through the openings in links 26 and the desired amount of space between links 26 is established by threading perforated spacers 30 onto studs 24. There is provided a selected number of spacers 30 between proximal links 26 and also between the shoulder on stud 24 and the outside link of the bank thereof. Spacers 30 are also between the other outside link 26 and the inner face of cap screw 28.

The series of grouped links 26 combine to produce a circumscribing segmental power transmitting element, the segments whereof are rectilinear. Force is transmitted along straight lines from one stud to another and the shape of each link is such as to utilize all of the force.

The longitudinal edges of each link 26 are straight and in parallel relation. The width of each link 26 is constant throughout its length, and therefore, the production of the links may be accomplished without waste of material as is the case where arcuate or annular force transmitting flexible parts are employed.

The spacers 30 are specially designed and have straight, beveled edges 31 that lie directly against the respective links 26 to set up a fulcrum about which the individual links may bend. Thus, an equalization of flexing throughout the width of links 26 is accomplished and no fatigue at any point nor along any overworked longitudinal path in the links, can occur. As illustrated in Fig. 5, when links 26 move from the position shown in full lines to that illustrated in dotted lines, the beveled edges 31 of spacers 30 contribute to an "easing" of the tendency to bend due to misalignment of shafts 10 and 12. Edges 31 of spacers 30 at each end of links 26 are in parallel relation and perpendicular to the longitudinal axis of the individual link with which the spacer 30 cooperates. The perforations in spacers 30 will prevent mal-adjustment and the links 26 are isolated by these spacers so far as the shoulders on studs 24 and the heads on cap screws 28 are concerned. Where normal flexing along lines established by edges 31 is permitted, the entire assembly will operate with greater freedom than that permitted where bending of the links against arched or circular edges of annular spacers is required.

It is also notable that the combination above specified, allows transverse flexing of links 26 along lines perpendicular to the line of force through which power is being transmitted—all to the end of greater efficiency and flexibility of the coupling as a unit. Obviously, structure different from that illustrated and described might be employed to embody the concepts of this invention, and therefore, it is desired to be limited only by the scope of the appended claims.

Having thus described the invention, what is claimed as new and desired to be secured by Letters Patent is:

1. A flexible coupling of the character described comprising a pair of spaced apart coupling members each having means for attachment to a shaft; a series of spaced apart studs disposed in an annular path on one of the said members; a series of spaced apart studs on the other of said members arranged in an opposed annular path to the first mentioned path and in staggered relation with the studs in said first mentioned path; at least one flat perforated flexible link joining proximal studs to form connections between all the studs of the coupling members; and perforated members on the studs having a straight edge extending transversely, entirely across each link respectively, to present a fulcrum for the individual links when said links are flexed in one direction, said edge being contoured to provide a rounded edge to the flexible link, said members and said links being separately threaded on each of said studs respectively to permit free movement of the links away from proximal members when flexed in the opposite direction.

2. A flexible coupling of the character described comprising a pair of spaced apart coupling members each having means for attachment to a shaft; a series of spaced apart studs disposed in an annular path on one of the said members; a series of spaced apart studs on the other of said members arranged in an opposed annular path to the first mentioned path and in staggered relation with the studs in said first mentioned path; a bank of perforated flexible links joining proximal studs and threaded thereon, said links having straight parallel longitudinal edges, the longitudinal axis of the links being perpendicular to a radial line extending from the center of rotation of said coupling members and intersecting the said longitudinal axis at its medial point; and perforated members threaded on the studs, beside each link respectively, formed to present a straight edge extending transversely completely across each link to equalize the bending stress when the links are flexed, said straight edge being positioned to intersect at right angles the longitudinal axis of the adjacent link.

LEON T. MART.

REFERENCES CITED

The following references are of record in the file of this patent:

UNITED STATES PATENTS

| Number | Name | Date |
| --- | --- | --- |
| 1,091,809 | Callan | Mar. 31, 1914 |
| 1,145,602 | Lieber | July 6, 1915 |
| 1,316,903 | Kuentzel | Sept. 23, 1919 |
| 1,483,561 | Ungar | Feb. 12, 1924 |
| 1,893,593 | Oechsle | Jan. 10, 1933 |